United States Patent [19]
Kluting et al.

[11] 4,252,370
[45] Feb. 24, 1981

[54] INERTIA LATCH SYSTEM FOR VEHICLE SEAT

[75] Inventors: Bernd A. Kluting, Radevormwald, Fed. Rep. of Germany; Daniel Boyer, Battle Creek; Vikram Zaveri, Springfield, both of Mich.

[73] Assignee: Keiper U.S.A., Inc., battle Creek, Mich.

[21] Appl. No.: 47,362

[22] Filed: Jun. 11, 1979

[51] Int. Cl.³ .................... A47C 1/00; B60N 1/04
[52] U.S. Cl. ......................... 297/379; 297/216
[58] Field of Search ............... 297/379, 216, 378, 366, 297/369

[56] References Cited
U.S. PATENT DOCUMENTS

| | | | |
|---|---|---|---|
| 2,873,794 | 2/1959 | Leslie et al. | 297/379 |
| 3,549,202 | 12/1970 | Boschen et al. | 297/216 X |
| 3,628,831 | 12/1971 | Close | 297/379 |
| 4,147,386 | 4/1979 | Stolper | 297/379 X |

Primary Examiner—William E. Lyddane

[57] ABSTRACT

A gravity and inertia responsive latch mechanism for accommodating pivotal forward tilting of a vehicle seat back to permit ingress and egress of back seat passengers when the vehicle is stationary without requiring manual release and for automatically preventing forward tilting of the seat back under sudden deceleration such as incident to a front end collision. A spring detent cooperates to resist initial forward tilting of the seat back rendering the inertia latch more dependable under marginal and unusual conditions of operation.

10 Claims, 7 Drawing Figures

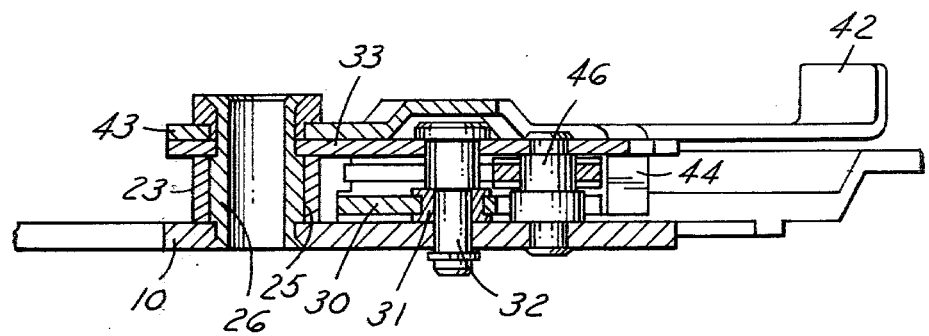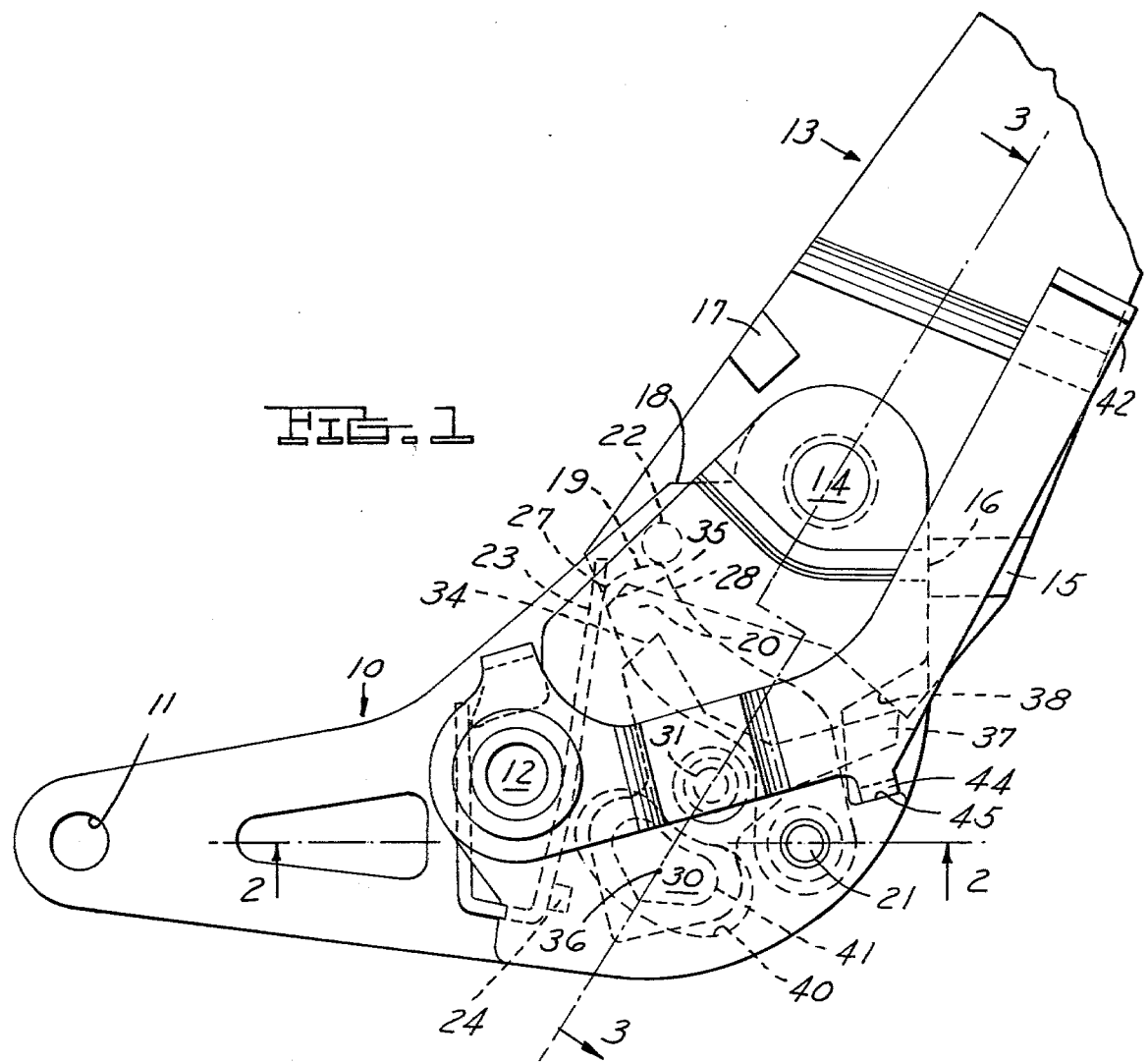

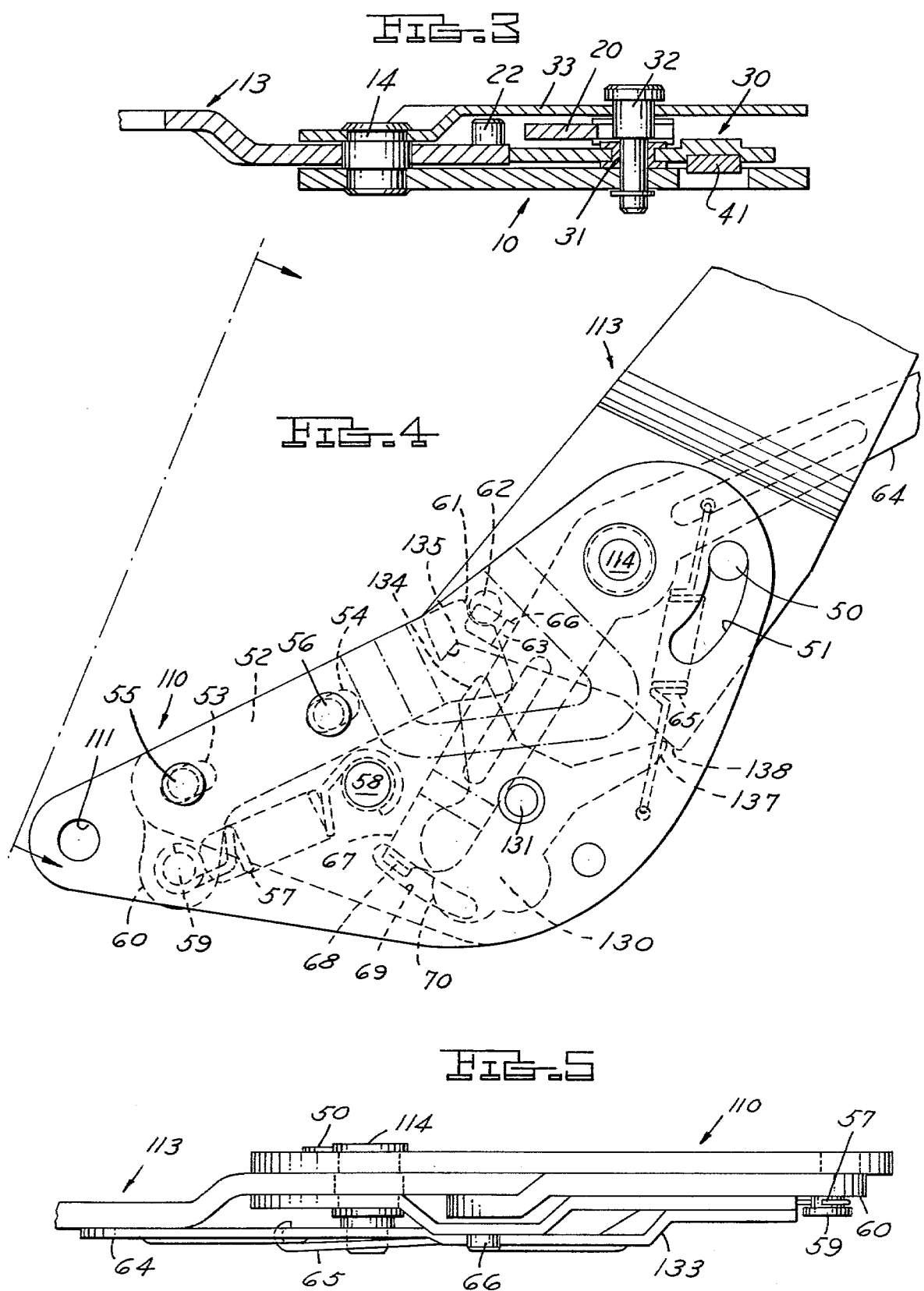

INERTIA LATCH SYSTEM FOR VEHICLE SEAT

BACKGROUND OF THE INVENTION

A number of inertia latch mechanisms have been devised for preventing forward tilting of the front seat back rest under sudden deceleration conditions, such as incident to front end collisions, while permitting such forward tilting to accommodate rear passenger ingress and egress without the inconvenience of actuating a manual release mechanism. Examples of known prior inertia latch constructions include the following issued U.S. Pat. Nos. 2,873,794, 4,082,353, 4,103,967, 3,674,309, 4,010,979 and 4,118,067. Another known prior inertia latch mechanism is disclosed in co-pending U.S. Application Ser. No. 931,306 filed by Wolfgang Osterhold.

Various problems and limitations have been encountered in prior constructions which the present improvement is directed to overcome. For example, with prior constructions undesired disabling of the inertia latch may occur when packages loaded in the back seat compartment press against and displace seat back slightly from full back position to a point where inertia incident to sudden deceleration would be inoperative to engage the latch; when the inertia element is mounted on the seat back hinge member, sudden forward tilting movement of the seat back, as by a rear seat passenger bracing himself in anticipation of an accident, may disable the inertia element from operating effectively upon impact deceleration; likewise even when the inertia element is mounted on the seat hinge member, if it is provided with a normally open or unlatched condition which requires deceleration inertia to move it into a latched position, a rapid forward tilting movement as caused by bracing of a rear seat passenger anticipating an accident may disable the inertia latch before impact deceleration has an opportunity to effectively actuate the latch mechanism. Furthermore, if the latch is not actuated by each forward tilting movement of the seat back and is only actuated by inertia upon sudden deceleration, friction build-up by dirt accumulation or otherwise may prevent or delay actuation when needed.

SUMMARY OF THE PRESENT INVENTION

The improved inertia latch system disclosed herein locates the inertia element on the seat hinge member in a normally latched position which requires gravity actuation to disengage the latch through normal gradual forward tilting of the back rest thus providing a failsafe system. Any sudden forward tilting movement of the seat back, even in the absence of vehicle deceleration, will not disengage the latch; and more importantly a spring detent providing initial resistance to forward tilting has been incorporated in the system to avert package deflection from disabling the inertia latch, provide more effective time for deceleration inertia to operate on the inertia element, and to provide a wider range for location of the center of gravity to accommodate all hill positions of gravity and inertia actuation.

BRIEF DESCRIPTION OF THE DRAWINGS

With reference to the drawings

FIG. 1 is a side elevation of an inertia latch hinge fitting in accordance with the present invention;

FIG. 2 is a sectional view taken along the line 2—2 of FIG. 1;

FIG. 3 is a sectional view taken along the line 3—3 of FIG. 1;

FIG. 4 is a side elevation of a modified inertia latch hinge fitting;

FIG. 5 is a view taken along the line 5—5 of FIG. 4;

With reference to FIGS. 1 to 3 the hinge fitting comprises a first hinge member 10 connectable to the seat of an automotive vehicle by suitable fasteners passing through apertures 11 and 12 and a second main hinge member 13 connectable to the back rest of a vehicle seat by suitable fasteners through the omitted extension of hinge member 13. A pivotal connection 14 is provided between the first and second hinge members. The back rest hinge member is subject to restriction of backward movement relative to the seat hinge member 10 by a positive stop 15 on the hinge member 13 engaging a rear extremity 16 on the seat hinge member 10 thus establishing the normal back rest position of the vehicle seat. A forward limit to the back rest position is established by engagement of a positive stop 17 on a hinge member 13 with an upper registration surface 18 on the hinge member 10 thus establishing the forward tilt limit position of the seat back for ingress and egress of the back seat passenger in a two-door vehicle.

Figure 6:
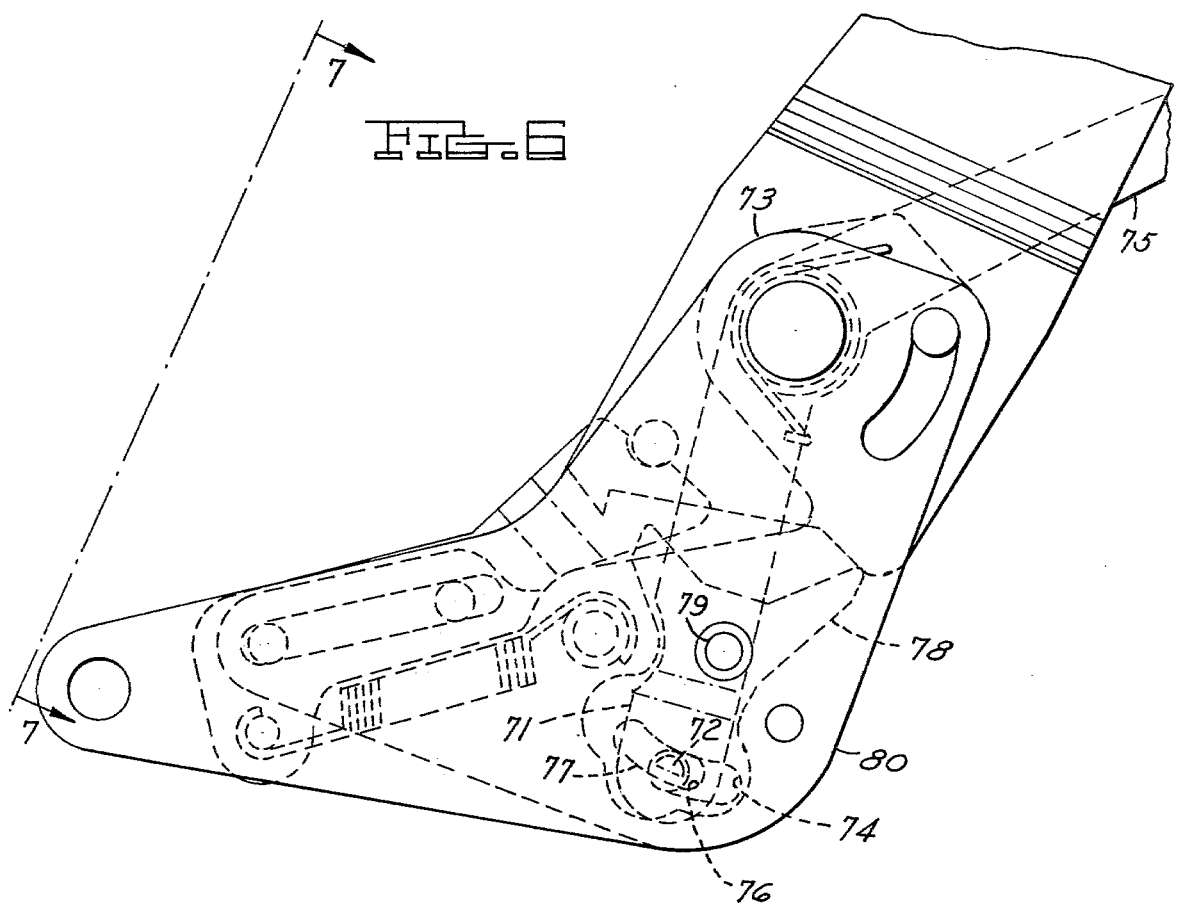
FIG. 6 is a side elevation of a further modified inertia latch hinge fitting.

Any initial forward tilting movement of the hinge member 13 and associated back rest is inhibited by engagement of the end 19 of a pawl 20 pivotally connected at 21 to seat hinge member 10 with a pin 22 projecting from the seat back hinge member 13 with a leaf spring 23 suitably anchored on the seat hinge member 10 having reaction points at a stop 24 and surface 25 of a sleeve 26 rigidly secured to the hinge member 10 as best illustrated in FIG. 2. The upper end of the leaf spring 23 is pretensioned in a counterclockwise direction during assembly to engage an end 27 of the pawl 20 urging it against the stop pin 22 with a predetermined resisting force adequate to restrain initial forward tilting of the seat back against normal vehicle decelerating forces, engagement of back seat loaded packages, and the like.

Such initial resistance to forward tilting movement cooperates to serve an additional function in conjunction with the inertia latch as later described. Once initial preload spring tension of the leaf spring 23 has been overcome by adequate forward tilting pressure on the seat back, stop pin 22 deflects the pawl 20 against the spring load sufficiently to pass onto the circular arcuate surface 28 having a radius substantially centered on the pivotal connection 14 so as to provide little if any continuing resistance to foward tilting of the seat back in moving to a full forward position.

A second control on forward tilting movement of the seat back hinge member 13 is provided by a weighted pendulum inertia latch element generally indicated as 30 pivotally mounted at 31 on the seat hinge member 10 by means of a stepped pivot pin 32 extending between a spacer plate 33 and rigidly associated seat hinge member 10. A forward projection 34 on the inertia latch element 30 is adapted in the absence of articulation from the position shown to engage a cooperating projection 35 at the lower extremity of the hinge member 13 upon initial forward tilting movement of the seat back hinge member 13 to arrest further forward movement of the seat back under emergency conditions, such as sudden deceleration incident to a front end collision, thereby preventing a rear passenger thrown against the seat back from forcing it against the driver or front seat passenger; or in the case of an empty front passenger seat from serving to arrest the forward inertia of the rear passenger. The center of gravity of the pendulum weighted inertia element 30 located approximately at the point 36 is forward and below the center of the pivot 31 serving normally to hold a rearward extension 37 of the inertia element in engagement with a lower surface 38 of the hinge member 13 causing counterclockwise articulation of the inertia element 30 upon normal gradual forward tilting of the seat back hinge member 13 in forward tilting of the seat for passenger ingress or egress with resultant movement of the forward projection 34 into non-engaging bypass relation with the cooperating projection 35 of the seat back hinge 13.

An aperture 40 is provided in the seat hinge member 10 to accommodate a weight projection 41 which adds mass to the inertia element 30 providing greater reliability in overcoming pivotal friction during normal forward tilting of the seat.

The spring detent action against initial forward tilting of the seat provides a cooperative function with the inertia latch beyond the functions already described resulting in greater reliability under all operating conditions; for example, under marginal conditions of deceleration through brake application prior to an accident the back seat passenger may brace himself against the forward seat back rest creating a potential for disabling the inertia latch which will be resisted by the spring detent action thereby giving an extra margin of time for the inertia latch to function under extreme deceleration. In another respect, the spring detent delay of seat back movement provides a wider range for acceptable location of the center of gravity to accommodate all hill inclinations of the vehicle affecting inertia operation of the latch. Thus with the vehicle traveling up a steep hill, the inertia effect of a given rate of deceleration is diminished and the possibility of rear passenger bracing against the seat back disabling the inertia latch correspondingly enhanced. On the other hand with the vehicle parked heading downwardly on a steep hill, the effectiveness of the inertia weight to unlatch to accommodate forward seat back tilting is diminished providing a potential for non-function as the angle of dependency of the center of gravity relative to the pivotal center approaches the angle of frictional resistance in the pivotal bearing. The constraints thus placed on the location of the center of gravity to accommodate all vehicle attitudes are substantially relaxed by the spring detent resistance to initial seat back forward tilting.

As a safety precaution to accommodate malfunction, or manual override of the inertia latch after an accident has left the vehicle in an unusual attitude, a release lever 42 is provided with a pivotal connection 43 on the tubular sleeve element 26 and a lateral extension 44 normally seated on a ledge 45 provided on the plate 33 adapted to engage the underside of the inertia latch extension 37 when the lever is manually raised thereby providing a positive manual release for the inertia latch under any unusual condition.

It will be understood that the tubular sleeve or bushing 26 riveted unto the seat hinge element 10 provides a shouldered seat for the spacer plate 33 which is also rigidly connected to the hinge member 10 by a shouldered pin 46 providing a positive limit stop for the inertia latch 30 in a clockwise direction when under initial deceleration actuation as well as a positive stop in a counterclockwise direction after forward seat tilting has accommodated gravity actuation to a release position.

With reference to FIGS. 4 and 5 a modified hinge construction is shown wherein comparable elements to those illustrated and described with reference to FIGS. 1-3 are designated with similar numbers having the prefix 1 added. Modified elements include a pin 50 seated in the hinge element 110 engaging an arcuate slot 51 in the hinge element 113 for limiting extremities of travel of the backrest relative to the seat in place of the positive stop elements 15, 16, 17 and 18 of the FIG. 1 embodiment. Also a slide 52 having slots 53 and 54 engaging guide pins 55 and 56 seated in the hinge member 110 spring loaded by tension spring 57 anchored at 58 to the hinge member 110 and connected to a pin 59 extending from a projection 60 of the slide 52 serves to preload a notched end 61 of the slide against a pin 62 projecting from the hinge member 113 thereby serving to provide a spring detent resistance to initial forward tilting of the seat back hinge member 113 functionally equivalent to pawl 20, pin 22 and leaf spring 23 elements of the FIG. 1 embodiment. Following initial actuation of the slide 52 accompanied by a movement of the pin 62 out of the notch recess 61 continued movement of the pin 62 along the slide end surface 63 provides little if any resistance to further tilting the seat back as in the case of pin 22 engaging the arcuate surface 38 in the FIG. 1 embodiment. A manual release lever 64 pivotally mounted on the hinge pivot 114 retained by tension spring 65 against a stop element 66 on the spacer plate 133 is provided with an extension 67 having a projection 68 extending through slot 69 in the spacer plate engageable with a projecting end 70 of the inertia latch element 130 for emergency release by lifting of the lever 64.

Figure 7:
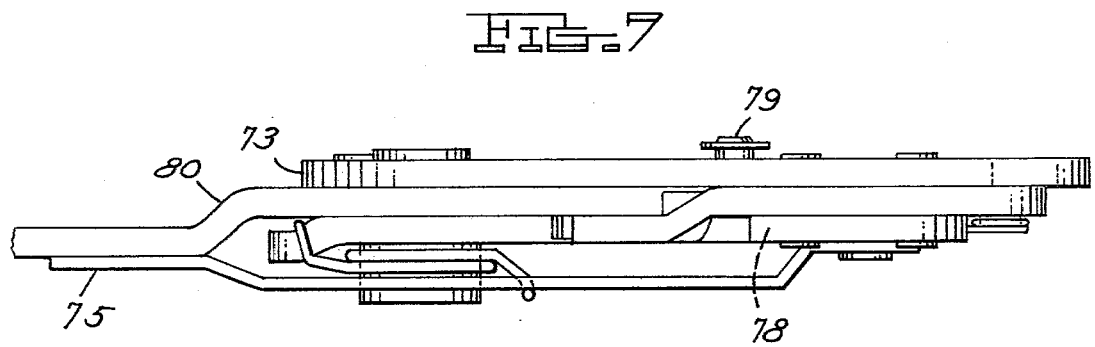
FIG. 7 is a view taken along the line 7—7 of FIG. 6.

With reference to FIGS. 6 and 7 a further modification of the embodiment of FIGS. 4 and 5 includes a release lever extension 71 having a pin projection 72 spring loaded by coil spring 73 against the end of slot 74 in the spacer plate 75 adapted upon actuation of the release lever 75 in a counterclockwise direction to engage the end 76 of an arcuate slot 77 provided in the inertia element 78 pivotally mounted at 79 to the hinge member 80.

We claim:

1. An inertia latch system for hinged vehicle seat back rests comprising, pivotally connected hinge members mountable respectively on seat and back rest vehicle components, interengaging inertia actuated latch means mounted on said respective hinge members operative upon sudden vehicle deceleration to prevent back rest forward tilting movement, and supplemental spring detent means operative to resist initial back rest forward tilting movement under all vehicle stationary or moving operating conditions.

2. An inertia latch system as set forth in claim 1 including means to render said spring detent means relatively ineffective to resist continued back rest forward tilting movement following initial movement overcoming spring detent resistance.

3. An inertia latch system as set forth in claim 2 wherein said spring detent means includes a pivoted leaf spring loaded pawl mounted on one of said hinge members interengaging a detent element on the other of said hinge members mounted to provide means for substantially deflecting said leaf spring during initial tilting movement together with arcuate surface means on said pawl for accommodating continued tilting movement without substantial additional deflection of said leaf spring.

4. An inertia latch system as set forth in claim 2 wherein said spring detent means comprises interengaging spring loaded slide and detent means mounted on said respective hinge members in a manner requiring substantial slide displacement in response to initial forward tilting movement of said back rest followed by substantially no additional slide displacement during continuation of the forward tilting movement.

5. An inertia latch system as set forth in claim 1 including an inertia element of said latch means pivotally mounted on said seat hinge member with means for interengaging latch surfaces on said back rest hinge member responsive to sudden vehicle deceleration.

6. An inertia latch system as set forth in claim 5 wherein said inertia element is normally positioned in a latching relationship to prevent back rest forward tilting with means for moving said inertia element to non-latching position in response to initial back rest forward tilting movement in the absence of vehicle deceleration.

7. An inertia latch system as set forth in claim 6 wherein said last means comprises means providing gravity actuation of said inertia element responsive to initial back rest forward tilting movement.

8. An inertia latch system as set forth in claim 7 wherein said inertia element has a center of gravity located so that the direction of gravitational and inertial deceleration forces passing therethrough extend on opposite sides of the pivotal center.

9. An inertia latch system as set forth in claim 8 wherein said center of gravity is positioned forwardly of and below the pivotal center and said inertia element is provided with an extension engageable with a latching surface of said back rest hinge member.

10. An inertia latch system as set forth in claim 9 including an extension on said inertia element and a cooperating cam surface on said back rest hinge member adapted to permit gravity actuation of said inertia element to a release position upon initial tilting of said back rest in a forward direction.

* * * * *